United States Patent [19]

Stephens et al.

[11] Patent Number: 5,490,783
[45] Date of Patent: Feb. 13, 1996

[54] FLIGHT SIMULATOR HAVING ACTIVE ELECTRONIC DISPLAY CONTROLS

[75] Inventors: Rocky C. Stephens; James C. Dutton, both of Fort Worth, Tex.

[73] Assignee: Lockheed Corporation, Fort Worth, Tex.

[21] Appl. No.: 182,584

[22] Filed: Jan. 18, 1994

[51] Int. Cl.$^6$ .................................................. G09B 9/08
[52] U.S. Cl. ............................ 434/35; 434/29; 434/30; 434/45; 434/43; 434/323
[58] Field of Search ........................ 434/29–35, 38, 434/43, 45, 49, 51, 323

[56] References Cited

U.S. PATENT DOCUMENTS

| | | | |
|---|---|---|---|
| 3,405,221 | 10/1968 | Nelson | 434/49 X |
| 3,471,627 | 10/1969 | Ziegler | 434/49 X |
| 3,471,942 | 10/1969 | Weitzman et al. | 434/49 X |
| 3,702,504 | 11/1972 | Cramer | 434/49 X |
| 4,233,756 | 11/1980 | Horwitz | 434/49 X |
| 4,787,024 | 11/1988 | Allsop et al. | 434/49 X |

*Primary Examiner*—Richard J. Apley
*Assistant Examiner*—Glenn E. Richman
*Attorney, Agent, or Firm*—Andrew J. Dillon

[57] ABSTRACT

A flight simulator is disclosed which includes active electronic display controls. A simulated cockpit area is provided which includes a visual display screen for depicting a simulated cockpit viewpoint. A simulated instrument panel is provided within the cockpit area by means of a cathode ray tube display device and an overlying bezel which defines the perimeter of at least one displayed instrument face within the cathode ray tube display device. A rotary switch which includes a rotary encoder having an output indicative of a direction of rotation and an amount of rotation is then mounted within the bezel. Outputs from the rotary switch are then coupled to electronic circuitry which is utilized to selectively vary the displayed instrument face within the cathode ray tube display device, providing a realistic representation of an actual flight instrument.

9 Claims, 6 Drawing Sheets

FLIGHT SIMULATOR HAVING ACTIVE ELECTRONIC DISPLAY CONTROLS

This invention was made with Government support under Contract Number F33657-82-C-2034 awarded by The Department of the Air Force. The Government has certain rights in this invention.

BACKGROUND OF THE INVENTION

1. Field of the Invention

The present invention relates in general to electronic training devices and in particular to flight simulator training devices. Still more particularly, the present invention relates to an electronic flight simulator training device having active electronic display controls.

2. Description of the Prior Art

The expense and complexity of modern military and civilian aircraft has lead to an increase in the utilization of sophisticated training devices, such as flight simulators. Such devices typically employ electronic images to simulate the cockpit viewpoint and also utilize hydraulic actuators to simulate movement of the aircraft.

The instrumentation typically utilized in such flight simulator devices has, in the past been implemented utilizing actual instrumentation; however, modern avionics instruments are quite expensive and the utilization of such instruments within a training device has thus become prohibitively costly.

More recently, avionics instruments have been simulated within flight training devices utilizing electronic display panels, such as liquid crystal displays or cathode ray tube displays. While such systems provide a cost effective method for simulating expensive instrumentation, the realistic look touch and feel of the controls typically associated with avionic instruments has been lost. Discrete on/off push buttons, or touch screen switches provided in conjunction with cathode ray tube displays or other display devices have been utilized; however, such switches serve as a poor substitute for rotary, electromechanical controls which are typically associated with modern avionics instruments.

Such push button switches or touch screen switches are generally utilized in conjunction with simulated avionics instrument displays as a result of the electronic display panel, which minimize the "depth" of the instrument panel and thus prohibit the utilization of rotary, electromechanical controls which provide a more realistic and accurate representation of actual instrument controls. The inability of such systems to locate the control at an appropriate and realistic location in order to provide accurate and realistic representations of rotary, electromechanical controls within such simulated instrument panels has resulted in training devices which are less than optimal in terms of the provision of a realistic simulated controls.

It should thus be apparent that a need exists for an instrument panel within a flight simulator training device which provides active, rotary, electromechanical controls which simulate actual avionics instruments controls in a manner not heretofore provided in the prior art.

SUMMARY OF THE INVENTION

It is therefore one object of the present invention to provide an improved electronic training device.

It is another object of the present invention to provide an improved flight simulator training device.

It is yet another object of the present invention to provide an improved electronic flight simulator training device having active electronic display controls.

The foregoing objects are achieved as is now described. The flight simulator of the present invention includes active electronic display controls. A simulated cockpit area is provided which includes a visual display screen for depicting a simulated cockpit viewpoint. A simulated instrument panel is provided within the cockpit area by means of a cathode ray tube display device and an overlying bezel which defines the perimeter of at least one displayed instrument face within the cathode ray tube display device. A rotary switch which includes a rotary encoder having an output indicative of a direction of rotation and an amount of rotation is then mounted within the bezel. Outputs from the rotary switch are then coupled to electronic circuitry which is utilized to selectively vary the displayed instrument face within the cathode ray tube display device, providing a realistic representation of an actual flight instrument.

Additional objectives, features and advantages will be apparent in the written description which follows.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
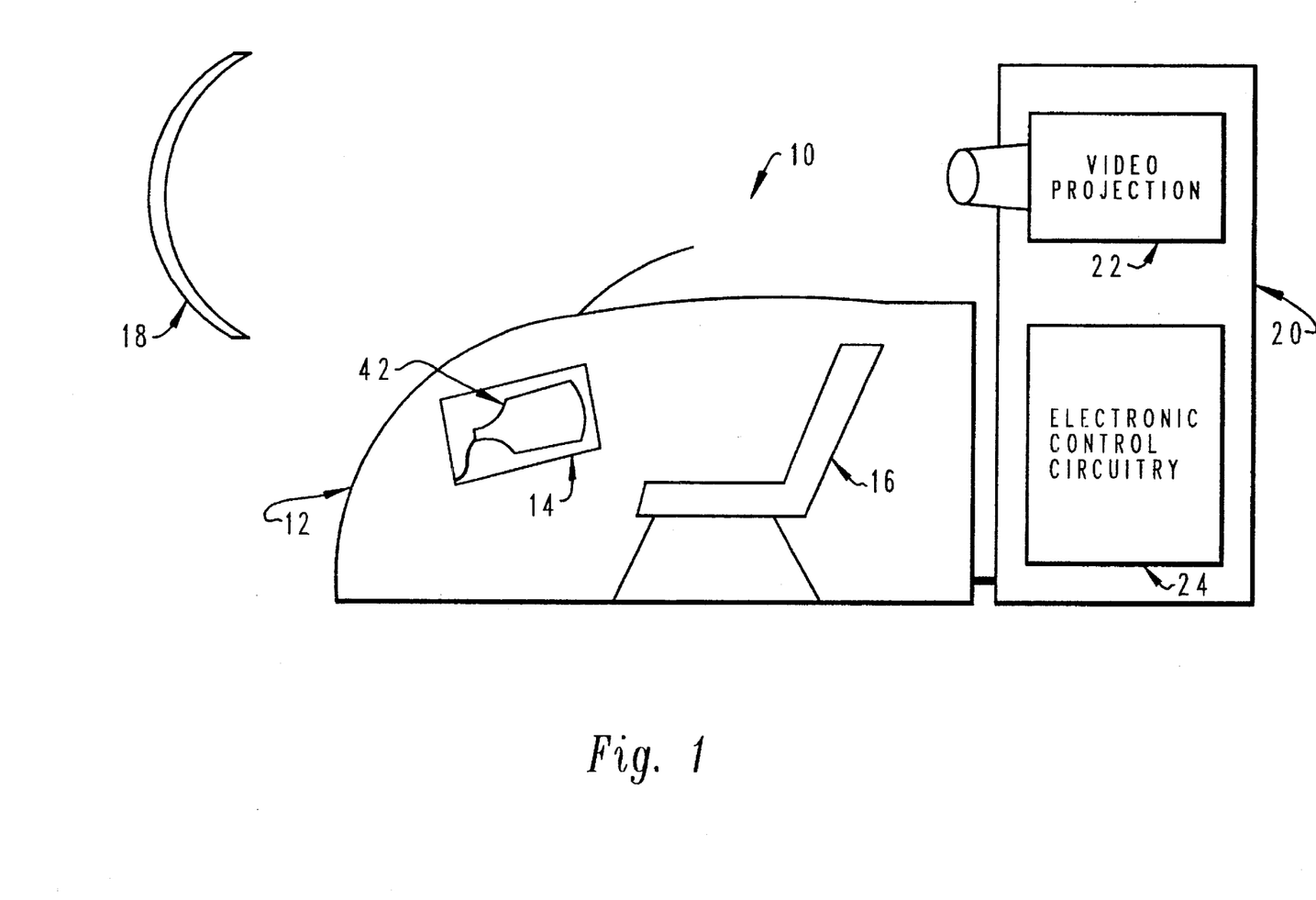
FIG. 1 is a pictorial representation of a flight simulator training device provided in accordance with the present invention.

With reference now to the figures and in particular with reference to FIG. 1, there is depicted a partially schematic pictorial representation of a flight simulator training device 10 which is provided in accordance with the present invention. As illustrated, flight simulator training device 10 includes a cockpit area 12 and a simulated instrument panel 14. An appropriate seat 16 is provided which is simulative of the seating provided within an actual aircraft. A viewpoint screen 18 is typically disposed proximate to cockpit area 12 and, in conjunction with video projection circuitry 22 within electronics module 20, viewpoint screen 18 is utilized to provide a visual simulation of the cockpit viewpoint during flight. Electronic control circuitry 24 is also provided within electronics module 20 and is utilized, in a manner which will be explained in greater detail herein, to vary the visual depiction of simulated instruments within instrument panel 14 which are provided utilizing cathode ray tube 42.

Figure 2:
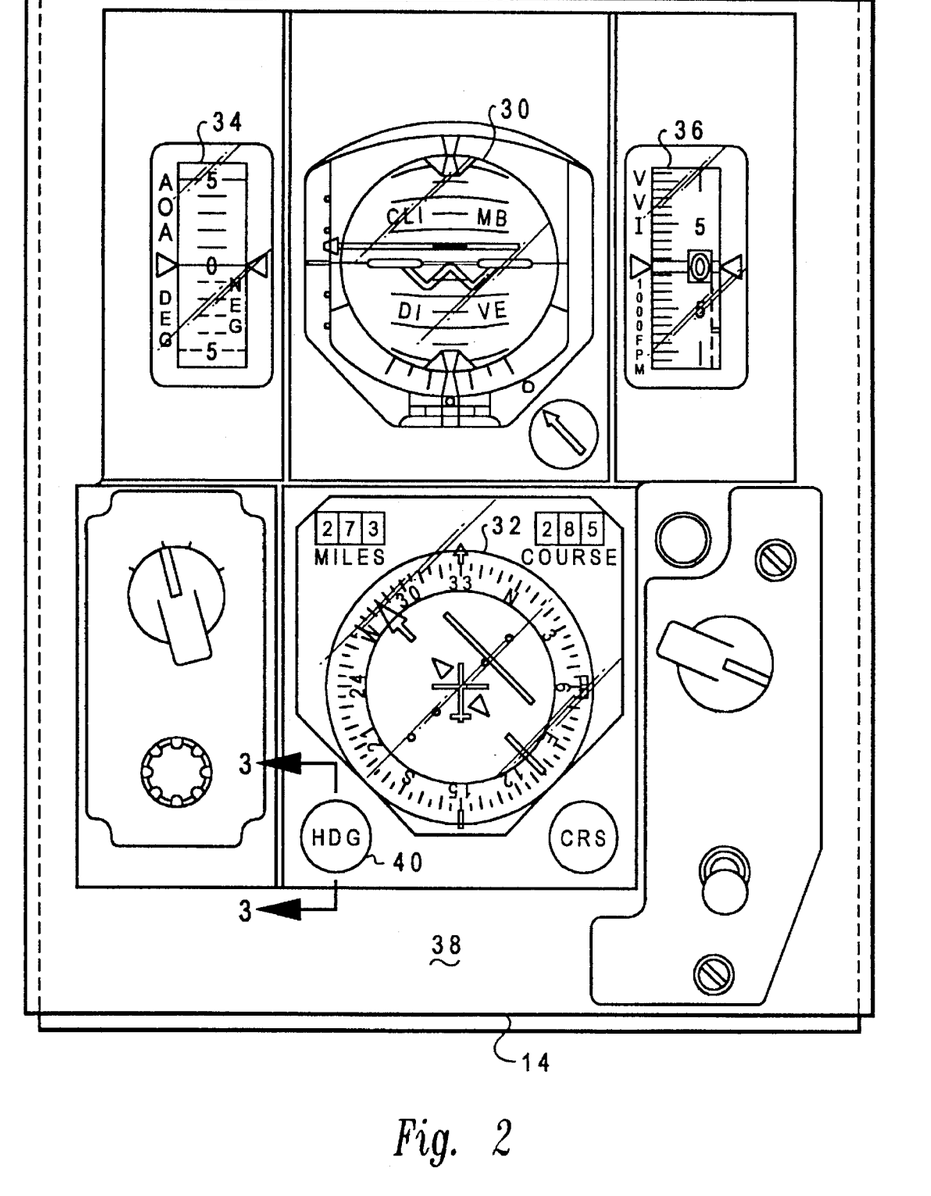
FIG. 2 is a pictorial representation of an instrument panel provided within the flight simulator training device of FIG. 1 in accordance with the present invention.

Referring now to FIG. 2, there is depicted a pictorial representation of an instrument panel 14 which is provided within flight simulator training device 10 of FIG.1 in accordance with the present invention. As illustrated, instrument panel 14 provides numerous instrument displays and various mechanical switches which are intended to simulate the cockpit instrumentation for a selected aircraft. One or more instrument faces may be provided, in accordance with a preferred embodiment of the present invention, utilizing cathode ray tube 42 (not shown) to display a visual output simulative of the face of various instruments. Thus, attitude indicator 30 and course and heading indicator 32 may be provided by displaying a visual output indicative of these instruments utilizing a cathode ray tube or liquid crystal display which is mounted within instrument panel 14. Similarly, angle of attack indicator 34 and vertical velocity indicator 36 may also be provided utilizing an electronic display panel in the manner described herein.

In order to provide an accurate simulation of the instrument panel typically utilized within an aircraft, an aluminum bezel 38 is provided and mounted in an overlying relationship with cathode ray tube 42 (not shown). Bezel 38 serves to define the perimeter of each instrument face which is displayed visually, utilizing cathode ray tube 42, in a manner which is highly realistic.

As described herein, the utilization of electronic display panels to provide a simulation of an avionics instrument has been proposed in the past; however, the provision of rotary electromechanical controls in association with such displays has not been possible due to the lack of "depth" within such an instrument panel. Thus, a rotary electromagnetic switch, such as rotary switch 40, could not previously be provided within a flight simulator instrument panel which utilizes electronic display panels in the manner described herein. However, as will be explained in greater detail below, rotary switch 40 may be implemented in a manner which is highly simulative of an actual rotary switch and rotary switch 40 may be mounted in an area which is an accurate representation of the actual instrumentation utilized within an aircraft.

Figure 3:
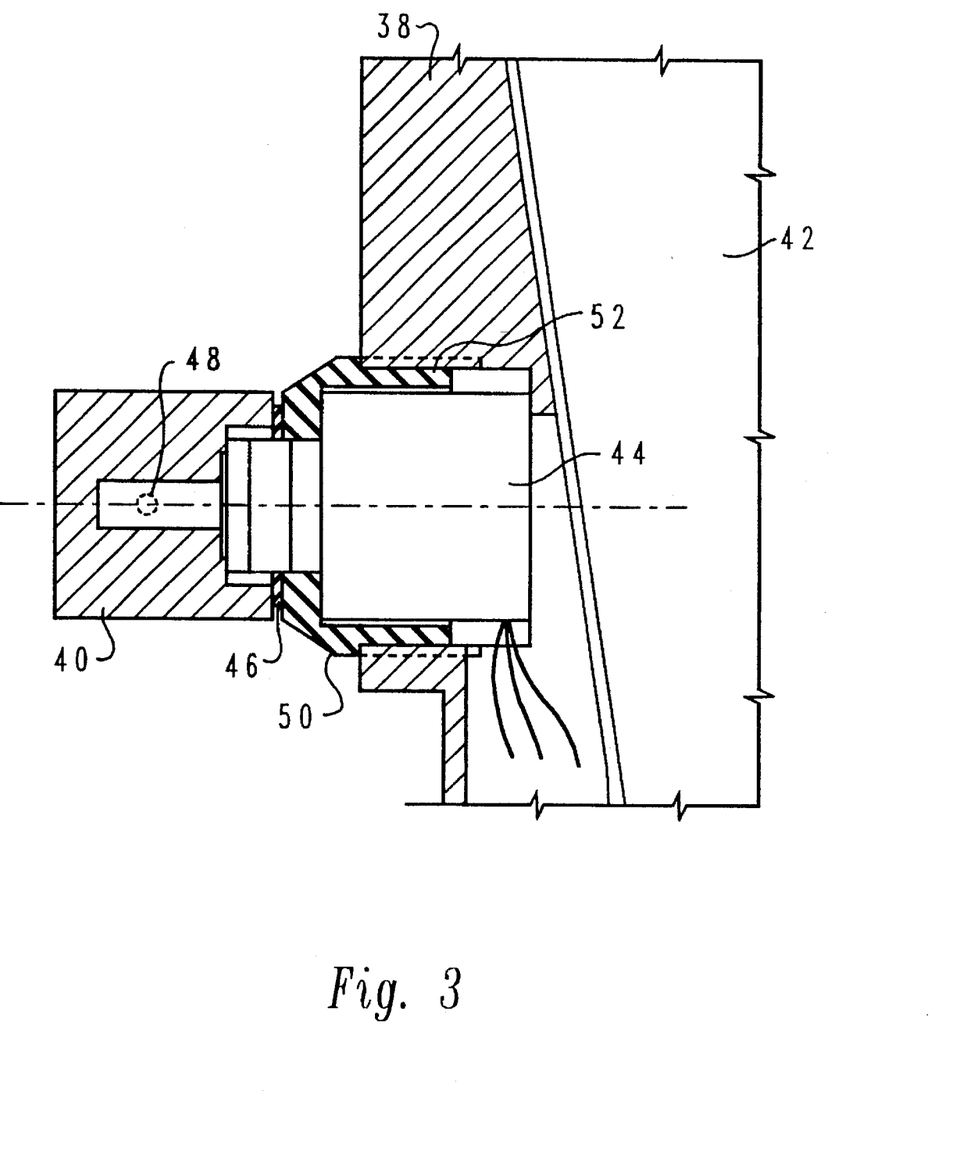
FIG. 3 is a sectional view of a rotary control switch provided in association with the instrument panel of FIG. 2 taken along line 3—3 in accordance with the present invention.

With reference now to FIG. 3, there is depicted a sectional view of rotary switch 40 which is provided within instrument panel 14 of FIG. 2, taken along line 3—3, in accordance with the present invention. As illustrated, bezel 38 is mounted flush against the screen of cathode ray tube 42. A threaded aperture 52 is provided within bezel 38 and a threaded collar 50 is then utilized to mount the rotary switch 40 within bezel 38. As illustrated, rotary switch 40 includes a rotary encoder 44. Rotary encoder 44 may be implemented utilizing any well known device for providing an output indicative of rotation, such as the Model No. 925 rotary encoder manufactured by Measurement Systems, Inc. of Fairfield, Conn.

Rotary encoder 44 is preferably mounted within threaded aperture 52 utilizing threaded collar 50 and rotary switch 40 is then mounted on shaft 48 in a manner well known in the art. Additionally, a frictional washer 46 is preferably provided between rotary switch 40 and threaded collar 50 in order to simulate the "feel" of an actual electromechanical rotary switch. As illustrated, the outputs of rotary encoder 44 are coupled to electronic control circuitry 24 (see FIG. 1) in a manner well known in the art by means of a wire routing area provided within bezel 38.

Figure 4:
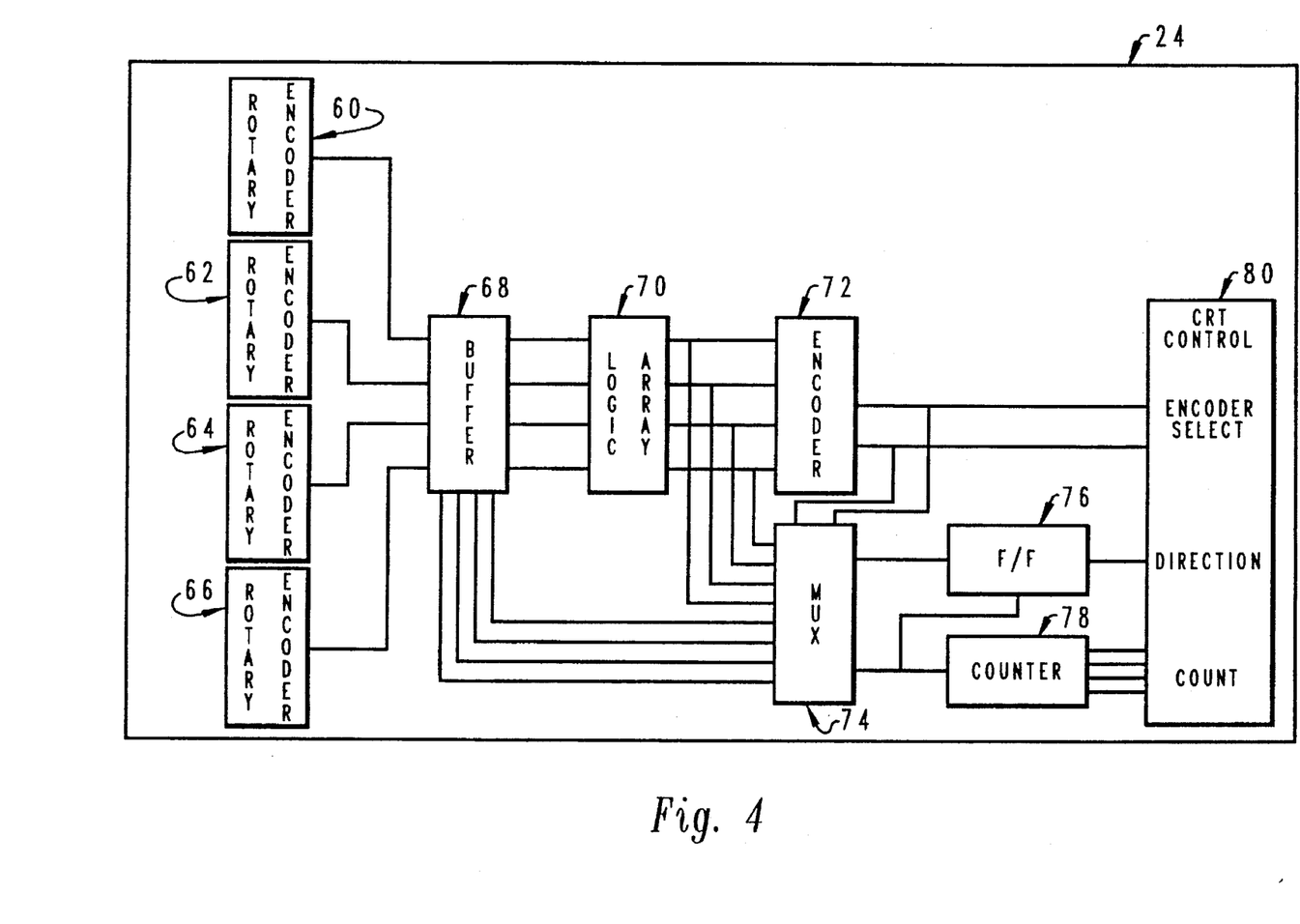
FIG. 4 is a block diagram of the electronic control circuitry utilized in association with the rotary control switch of FIG. 3.

Referring now to FIG. 4, there is depicted a block diagram of electronic control circuitry 24 which is utilized in conjunction with each rotary switch within instrument panel 14 of the present application. As illustrated, multiple rotary encoders and associated switches may be utilized. The depicted embodiment includes four rotary switches, each having an associated rotary encoder 60, 62, 64, and 66. In a manner which will be explained in greater detail herein, each rotary encoder is capable of providing an output signal which may be utilized to indicate an amount of rotation and a direction of rotation. The output of each rotary encoder is then coupled to buffer 68. The output of buffer 68 is then coupled to a programmable logic array 70 which is utilized to determine which rotary encoder is generating an output signal at a selected time point. In the depicted embodiment of the present invention, only a single rotary encoder may be activated at one time.

The output of the programmable logic array 70 and buffer 68 are then coupled to multiplexor 74. Multiplexor 74 is utilized to determine which of two timing waveforms generated by a rotary encoder has started first, thus generating an indication of the direction of rotation for a rotary encoder. In a manner which will be explained in greater detail herein, each rotary encoder has two channel outputs and the output of each channel is slightly out of phase with the other channel. Thus, by detecting which channel begins an output first, the direction of rotation for a rotary encoder may be determined. The output of multiplexor 74 is then utilized to set, or reset a flipflop circuit 76. The output of flipflop circuit 76 thus may be utilized to indicate the direction of rotation of a selected rotary encoder.

The output of programmable logic array 70 is also coupled to encoder 72 which provides an encoder select signal to cathode ray tube control circuit 80. The encoder select signal is utilized by cathode ray tube control circuit 80 to determine which rotary encoder is active, thus determining which simulated instrument face must be modified in response to a movement of a rotary encoder. Finally, the waveforms output by an active rotary encoder are also analyzed to determine the number of waveforms output from an encoder, thus providing an indication of the amount of rotation which has been generated utilizing an associated rotary switch. Counter circuit 78 counts each waveform and provides to cathode ray tube control circuit 80 a digital indication of the amount of rotation, thus permitting cathode ray tube control circuit 80 to alter the simulated display of an instrument face based upon the direction of rotation of a rotary encoder and the amount of rotation.

Figure 5:
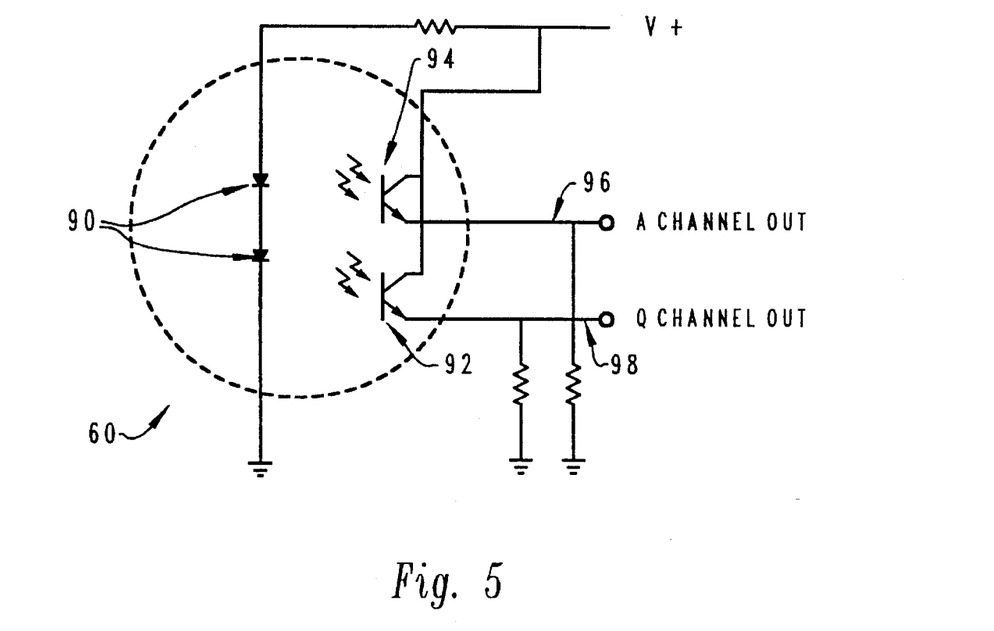
FIG. 5 is a detailed electronic schematic representation of the rotary encoder utilized with the rotary control switch of FIG. 3.

With reference now to FIG. 5, there is depicted a detailed electronic schematic of a rotary encoder which may be utilized with the rotary control switch of FIG. 3. As illustrated, rotary encoder 60 includes a pair of light emitting diodes 90 which may be utilized to activate photosensitive diodes 92 and 94. The rotary encoder device described above includes a plurality of rotatable apertures which periodically during rotation permit light emitted from light emitting diodes 90 to impinge upon the photosensitive surfaces of photosensitive diodes 92 and 94. Thus, each time light impinges upon photosensitive diode 92 or 94, a pulse is output via output 96 or 98, respectively.

Figure 6:
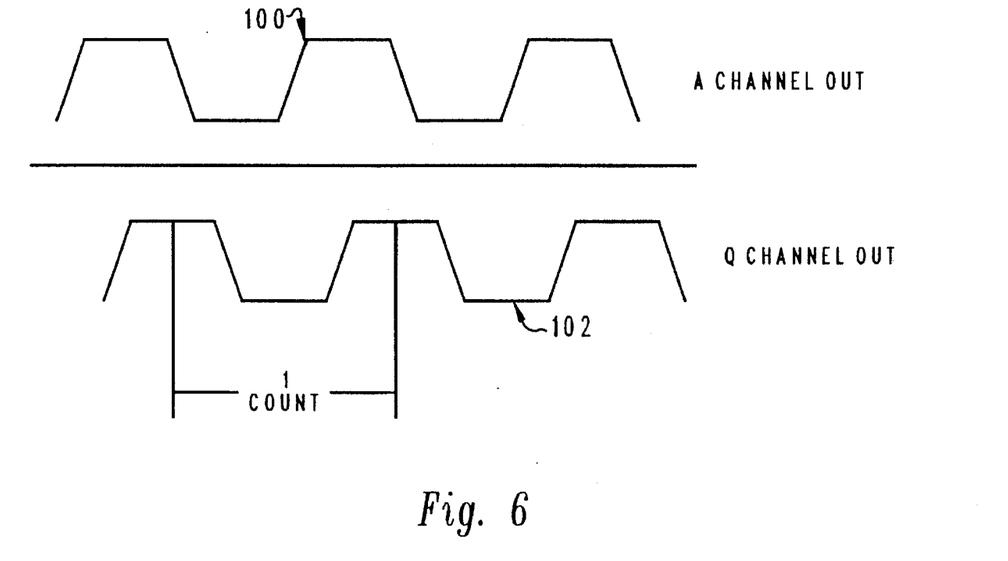
FIG. 6 is a timing diagram of the output of the rotary encoder of the rotary control switch of FIG. 3.

Referring now to FIG. 6, there is depicted a timing diagram of the output of the rotary encoder of FIG. 5. As illustrated, each channel outputs a series of pulses in response to a rotation of the rotary switch associated with the rotary encoder. The physical displacement of the two photosensitive diodes and the rotation of the apertures within rotary encoder 60 results in a slightly out-of-phase output from the two channels. Thus, A channel output 100 will detect the impinging of light upon photosensitive 94 slightly before light is detected at photosensitive diode 92. Thus, Q channel output 102 lags behind a channel output 100 in the manner depicted within FIG. 6. Each pulse output at a channel of a rotary encoder 60 is thus indicative of a selected amount of rotation and each peak output within a channel may be simply and easily detected and referred to within this document as a "count," indicative of an amount of rotation applied to a rotary switch which is utilized in association with a rotary encoder.

Thus, referring to FIGS. 4, 5, and 6, it may be seen that by providing an electronic rotary encoder in association with each rotary switch mounted within instrument panel 14, the flight simulator of the present invention may be utilized to simulate with great accuracy rotary electromechanical switches typically utilized in association with avionics instruments. The two channel outputs of each encoder may be simply deciphered to generate signals indicative of a direction of rotation and an amount of rotation and those signals may thus be utilized to vary the display of an instrument face provided by a cathode ray tube or liquid crystal display (LCD) panel. Those skilled in the art will appreciate that alternate electronic rotary encoders may also be utilized by simply determining a relationship between the amount of rotation and the number of "counts" generated by such a rotary encoder, in order to accurately simulate a rotary electromechanical switch.

Figure 7:
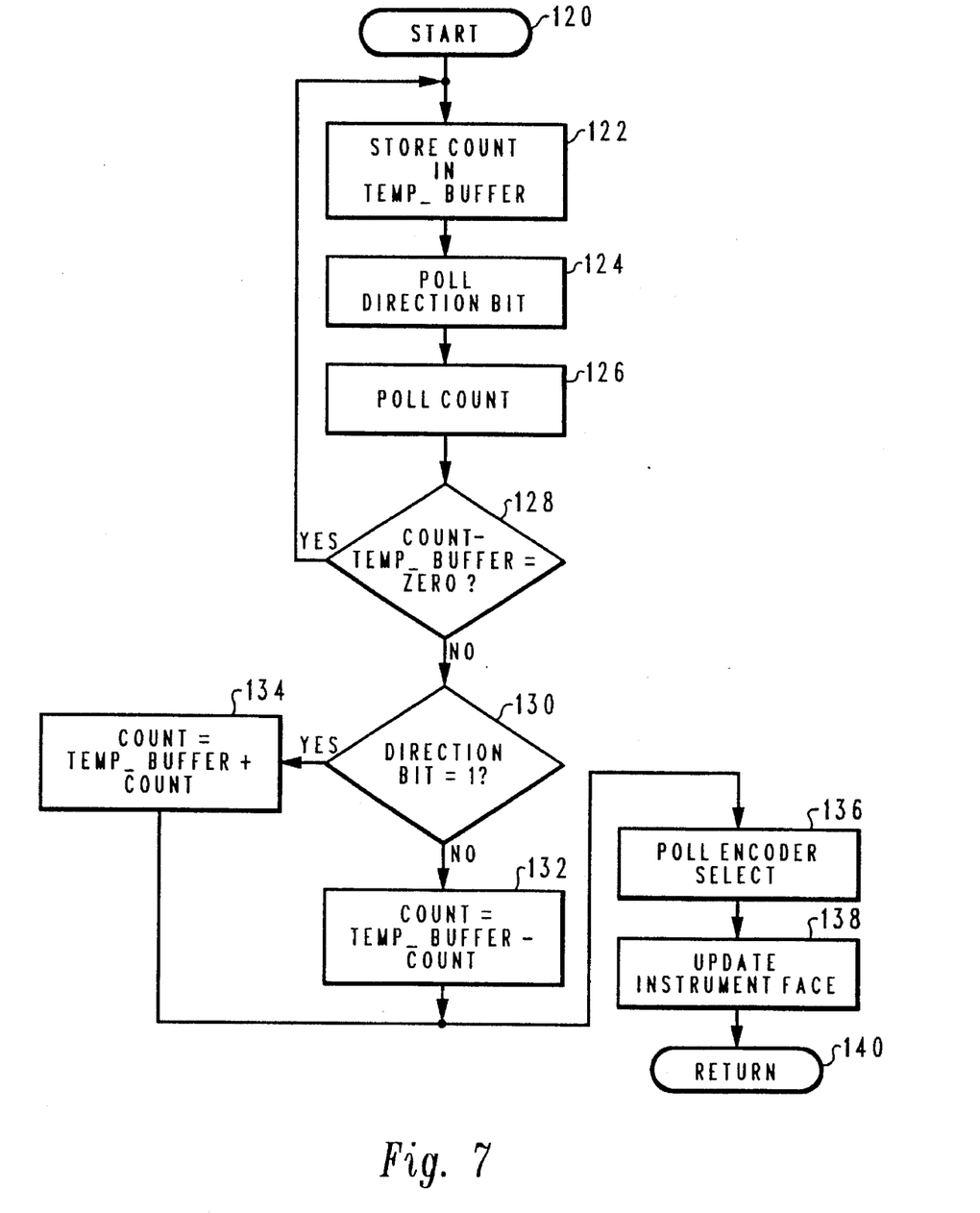
FIG. 7 is a high level logic flowchart of a process for controlling an instrument panel display utilizing the output of the rotary encoder of FIG. 5.

Finally, with reference to FIG. 7, there is depicted a high level logic flowchart which illustrates a process for controlling an instrument panel display utilizing the output of rotary encoders in the manner described herein. As illustrated, the process begins at block 120 and thereafter passes to block 122. Block 122 illustrates the storing of the "count" from a rotary encoder within a temporary buffer. Next, as depicted within block 124, the direction bit is polled. Polling the direction bit provides an indication of whether or not the rotation of the rotary switch is clockwise or counterclockwise. As described above, this may be determined by simply determining which output channel from a rotary encoder first generated an output signal.

Next, as illustrated at block 126, the "count" is polled. This step comprises a periodic determination of the number of the "count" number output by a particular rotary encoder. The process then passes to block 128. Block 128 illustrates a comparison between the current count and the count within the temporary buffer. If this comparison indicates no difference, the process returns, in an iterative fashion to block 122 to await a rotation of an associated rotary switch. A failure of the system to detect a difference between the current count and the count within the temporary buffer indicates that the rotary switch has not moved.

Still referring to block 128, in the event a difference exists between the current count and the count within the temporary buffer, the process passes to block 130. Block 130 illustrates a determination of whether or not the direction bit is set equal to "1." If so, this, in the depicted embodiment of the present invention, indicates a clockwise rotation of the rotary switch and the process passes to block 134. Block 134 illustrates the incrementing of the current count by adding the current count to the count within the temporary buffer. Alternately, in the event the direction bit is not set equal to "1," indicating a counterclockwise rotation, the process passes to block 132. Block 132 illustrates the decrementing of the count by subtracting the current count from the count within the temporary buffer.

Next, after either incrementing or decrementing the current count, the process passes to block 136. Block 136 illustrates the polling of the encoder select circuit. As described above, this provides an indication of which rotary encoder is currently being activated. Thereafter, the process passes to block 138. Block 138 illustrates the updating of the display of the instrument face in an amount and direction which is consistent with the count and rotation detected as described herein. Thereafter, the process passes to block 140 and returns to await a subsequent input to a rotary encoder.

As those skilled in the art will appreciate, the process depicted within FIG. 7 may occur periodically at regularly timed intervals or, alternatively, circuitry may be provided which activates this process in response to a rotation of a rotary switch associated with a rotary encoder. In either event, the process described herein may be implemented utilizing any well known computer based technique and can thus be utilized to provide control signals for varying the display of a simulated instrument face within a cathode ray tube in the manner described herein.

While the invention has been shown in only one of its forms, it is not thus limited but is susceptible to various changes and modifications without departing from the spirit thereof.

What is claimed is:

1. A simulated instrument panel for utilization in a training device, said simulated instrument panel comprising:

an imperforate electronic display panel for providing a visual output simulative of at least one instrument face;

a bezel mounted and overlying to said imperforate electronic display panel for defining the perimeter of said at least one instrument face;

at least one rotary switch mounted within said bezel at a point overlying said imperforate electronic display panel; and electronic control circuitry coupled to said rotary switch for selectively varying said visual output simulative of at least one instrument face in response to rotation of said at least one rotary switch.

2. The simulated instrument panel for utilization in a training device according to claim 1, wherein said imperforate electronic display panel comprises a cathode ray tube.

3. The simulated instrument panel for utilization in a training device according to claim 1, wherein said at least one rotary switch includes a rotary encoder having an output indicative of a direction of rotation and an amount of rotation.

4. The simulated instrument panel for utilization in a training device according to claim 1, wherein said at least one rotary switch includes a frictional washer for simulating rotation of an actual switch.

5. A flight training device comprising:

a simulated cockpit area;

an imperforate electronic display panel for providing a visual output simulative of at least one instrument face;

a bezel mounted to and overlying said imperforate electronic display panel for defining the perimeter of said at least one instrument face;

at least one rotary switch mounted within said bezel at a point overlying said imperforate electronic display panel; and electronic control circuitry coupled to said rotary switch for selectively varying said visual output simulative of at least one instrument face in response to rotation of said at least one rotary switch.

6. The flight training device according to claim 5, wherein said imperforate electronic display panel comprises a cathode ray tube.

7. The flight training device according to claim 5, wherein said at least one rotary switch includes a rotary encoder having an output indicative of a direction of rotation and an amount of rotation.

8. The flight training device according to claim 5, wherein said at least one rotary switch includes a frictional washer for simulating rotation of an actual switch.

9. The flight training device according to claim 5, further including a visual display screen disposed proximate to said simulated cockpit area for providing a simulated cockpit viewpoint.

* * * * *